UNITED STATES PATENT OFFICE 2,475,582

AGGLOMERATING CRYSTALLINE SOLIDS

Tsai H. Chao, Somerville, N. J., assignor to American Cyanamid Company, New York, N. Y., a corporation of Maine No Drawing. Application January 24, 1946, Serial No. 643,205

10 Claims. (Cl. 260—306.5)

This invention relates to the separation of solid particles from an aqueous slurry and in particular to the isolation of 2,2'-dithiobisbenzothiazole.

2,2'-dithiobisbenzothiazole, commonly designated as "benzothiazyldisulfide" or by the trade name "Altax," has the chemical formula

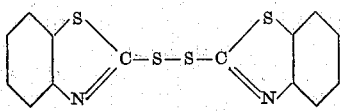

It is manufactured in large quantities for a variety of purposes, one of the principal uses being as an accelerator for the vulcanization of rubber.

In commercial practice it is usually obtained by oxidizing 2-mercaptobenzothiazole while the latter is either suspended in water or dissolved in aqueous alkali. Various oxidizing agents have been employed for this purpose, such as, for example, chlorine, hydrogen peroxide, persulfates, dichromates, dilute nitric acid or nitrogen oxide gases. Although the oxidation per se is readily carried out, the manufacturing processes are subject to a serious disadvantage. The water-insoluble 2,2'-dithiobisbenzothiazole is usually obtained in such physical form that its separation and recovery from the resulting aqueous slurry is a very time-consuming procedure.

As illustrative of the problem, in oxidizing 2-mercaptobenzothiazole dissolved in aqueous alkali with chlorine by the usual commercial processes the slurry obtained is a cloudy suspension of fluffy, curd-like, 2,2'-dithiobisbenzothiazole particles of variable size. A considerable portion of the product will not settle on standing, and during filtration tends to clog up the openings in the filter. If centrifugal filtration is employed, the suspended particles, under the influence of the centrifugal force, soon build up an almost impenetrable wall against the filtering medium, markedly reducing the rate of flow. In subsequent washing with water to remove inorganic salts, excessive washing time is required. Finally, the washed, centrifuged cake which still retains substantial quantities of water is hard to dry and requires excessive time in the hot air oven usually employed. Thus the centrifugal filtration, washing and drying steps all are slow operations which require the use of costly equipment.

It is, therefore, the principal object of this invention to convert particles of 2,2'-dithiobisbenzothiazole, while suspended in aqueous slurry, into a form in which the time required for the recovery of the 2,2'-dithiobisbenzothiazole therefrom, particularly during the filtering, washing and drying operations will be materially shortened.

In general this result is readily obtained by agitating the slurry, preferably while heating, in the presence of a relatively small amount of a suitable inert, water-immiscible, organic liquid. An apparent agglomeration of the particles occurs, resulting almost instantaneous settling when the agitation is discontinued. This simplifies the product separation in several ways. It becomes possible to decant much of the liquid, thereby greatly decreasing the time cycle. Further, the settled material itself is in such physical form that it is readily filtered, washed and dried.

A portion of the particles in the original slurry are sufficiently large to sink of their own accord, particularly when the smaller suspended particles are removed. It is only necessary therefore to add enough of the organic liquid to agglomerate the smaller suspended particles. Assuming efficient agitation and adequate time to allow maximum contact, a clear, aqueous, readily-decanted slurry is readily obtained.

While I do not limit myself to any particular theory of operation or explanation of this surprising phenomena, apparently the smaller suspended particles, which ordinarily cause the difficulty on filtration, become preferentially wetted or dissolved by the organic liquid to form a sticky nucleus to which other particles adhere on contact during agitation. These agglomerates become sufficiently large or sufficiently dense to settle to the bottom of the container. They are quite stable, even remaining aggregated on distilling the organic liquid from the slurry.

In a batch process, a small quantity of the immiscible organic liquid is added directly to the 2,2'-dithiobisbenzothiazole slurry. The mixture is then agitated so as to bring the suspended particles into intimate contact with the organic liquid. Since it appears to increase the speed of the process, the slurry is preferably heated during agitation. Treatment is continued until the mother liquor quickly becomes clear on standing and the 2,2'-dithiobisbenzothiazole aggregates quickly settle. The supernatant clear liquor is then decanted off and the agglomerate filtered, washed and dried. Under optimum conditions, the agglomeration occurs almost instantly.

It is an advantage of the present invention that the presence of the organic liquid creates no particular removal problem. It may be readily recovered by distillation and reused, thus resulting in a considerable saving. Because the agglomeration occurs almost instantaneously, it is a further advantage that distillation of the organic liquid may be started almost immediately after it is added. No preliminary heating period is required and agglomeration is readily completed during the time required to distill off the organic liquid.

A further advantage of the process, however, is that it may be practiced readily even when distillation apparatus is not available. The organic liquid does not separate as an additional phase but appears to be contained in the solid agglomerated material. It remains with the solids through the filtering and washing steps and may be eliminated during the final drying procedure.

It is a further advantage of the process that because of these factors it is readily adapted to continuous operation. In a continuous process, the slurry of 2,2'-dithiobisbenzothiazole and the organic liquid separately, or a mixture of the two, are flowed, preferably at a constant rate, into a container in which the mixture is stirred and heated at the desired temperature. The agglomerated material then flows countercurrently to a stream of steam, the rate of flow and the design of the equipment being adjusted so that substantially all of the organic liquid is removed by the steam. The agglomerate is then collected in an appropriate receiver while the organic liquid and water vapors are condensed, the organic liquid separated therefrom and reused.

Some foaming may occur during the removal of the last traces of the organic liquid in either a batch or continuous process. Its effect is harmless in the equipment of the proper design. Foaming also may be reduced by the addition of a suitable anti-foaming agent such as an oil; sardine oil, for example, being useful for this purpose. Since 2,2'-dithiobisbenzothiazole is frequently mixed with a small quantity of sardine oil, or the like, for purposes of sale as a rubber accelerator, addition of the oil at this stage may obviate the necessity of adding it later.

It is also an advantage of the process that the operating temperature is not critical. Higher temperature generally results in quicker agglomeration and larger-sized aggregates. Optimum results are usually obtained at temperatures about 80° C., or somewhat higher. As an illustration, adding 40 cc. of chlorobenzene at various temperatures to one liter of slurry containing approximately 5% by weight of 2, 2'-dithiobisbenzothiazole gave the following results:

| Temperature | Agglomeration Started | Completed | Average diameter of Agglomerated Particle |
|---|---|---|---|
| 50° C | 1 min | 3.5 min | 0.5 to 1mm. |
| 60° C | 0.5 | 2.1 min | 2-3 mm. |
| 70° C | 0.2 | 1.0 min | 3-5 mm. |
| 80° C | Substantially | Instantaneous | 3-5 mm. |

Since both agglomeration and distillation of the organic liquid may take place simultaneously as discussed above, the operating temperature may be controlled readily by selecting an organic liquid which forms an azeotropic mixture with the water, which mixture has the desired boiling point.

A wide variety of inert organic liquids may be used according to the process of this invention. The choice among the various possible organic liquids is based largely on such factors as price, ease of recovery, and efficiency of operation. Organic liquids which have been found to function most satisfactorily are, in general, those which with water form azeotropes that boil above 80° C., and contain as high a percentage of the organic liquid as possible; which are heavier than water and immiscible with it; and which have some wetting or solvent action for the 2,2'-dithiobisbenzothiazole. A high boiling organic liquid will usually be more efficiently recovered in ordinary plant equipment than a low boiling organic liquid. As has been shown above, the higher the temperature used for the process, up to about 80° C., the better the agglomerating effect. Therefore, in the preferred process in which the heating simultaneously serves two functions (1) to bring about agglomeration and (2) to distill off the organic liquid, the organic liquid chosen should form with water an azeotrope which boils above 80° C.

Since the majority of organic liquids form azeotropes with water which boil at a temperature below the boiling point of the lowest component, this means that the boiling point of the organic liquid will generally be above 80° C. Organic liquids forming azeotropes in which the organic liquid occurs in higher proportion require less steam for recovery. Organic liquids which are heavier than water give more satisfactory contact with the particles to be agglomerated than those which tend to float on the surface of the mixture. When the organic liquid has formed the nucleus of an agglomerated particle, the sinking effect on that particle will obviously be greater, the greater the density of the organic liquid. While an organic liquid which is partially soluble in water may be used, a greater quantity of it will be required since that amount which is dissolved is, in general, ineffective for purposes of agglomeration. Substantially all organic liquids will have some wetting and/or solvent action for 2,2'-dithiobenzothiazole.

While the invention is not limited to any particular organic liquid, different liquids are operative with varying degrees of efficiency. Without intending to limit the present invention, some typical organic liquids which are operative in this process are the following: hydrocarbons, such as benzene, toluene, xylene, coal tar naphthas, cymene, cyclohexane, petroleum hydrocarbons, e. g., hi-flash naphtha, Decalin, tetralin, mesitylene, mixed hexanes; chlorohydrocarbons, such as chloroform, ethylene dichloride, tetrachloroethane, perchloroethylene, carbon tetrachloride, monochlorobenzene; nitrohydrocarbons, such as nitrobenzene, nitrotoluene, nitroxylene, nitrocymenes and the nitroparaffins; aniline and aniline derivatives, such as methylaniline and dimethylanine; esters including the butyl, amyl and benzyl esters of propionic, butyric and lactic acids, ethylene glycol diacetate. Chlorobenzene gives excellent results and in many ways is perhaps to be preferred. It is available in commercial quantities at low cost and only a small quantity is needed; it can be easily recovered without appreciable loss; it is chemically inert under normal conditions and is relatively non-hazardous.

The amount of organic liquid used may vary widely, depending on which organic liquid is used, the relative proportion of the smaller suspended particles contained in the original slurry, the size of the final particles desired for optimum efficiency in the available filtering equipment, and on the time to be allowed for reflux before distilling off the organic liquid. When a longer reflux time is taken, the amount of organic liquid may, in general, be decreased. An aqueous slurry, obtained, for example, by the chlorine oxidation of an alkaline solution of 2-mercaptobenzothiazole, containing about 5% by weight of 2,2'-dithiobisbenzothiazole in suspension and about 1.5% by weight of the inorganic salts in solution, should not require more than 5% by weight of the organic liquid. The optimum amount can be quickly ascertained. A smaller quantity of the organic liquid is usually insufficient to produce optimum results and a larger quantity is not only unnecessary but increases recovery costs. In no case is the amount required for this process sufficient to dissolve more than a small part of the 2,2'-dithiobisbenzothiazole contained in the slurry, and all of the organic liquid will become occluded in the solid agglomerate during the process. This process is, therefore, to be distinguished from any solvent extraction methods in which the 2,2'-dithiobisbenzothiazole is substantially dissolved in an organic solvent which forms a separate liquid layer in the process.

While the process is preferably carried out by refluxing at ordinary pressures, satisfactory results can also be obtained by autoclaving at higher pressures. The advantage of the use of increased pressure is that low boiling and low density organic liquids, e. g., benzene, toluene and the like, can be used with results comparable to those obtained with high boiling and high density organic liquids at ordinary pressure. The grain size of the agglomerated particles may also be greater. Because of the necessary manipulation in handling an autoclave, the time cycle may be longer and recovery of the organic liquid may not be as efficient under these conditions.

This invention may be illustrated by the following examples, all parts being parts by weight.

Example 1

A mixture of 2 parts of the organic liquid and 100 parts of an aqueous slurry of 2,2'-dithiobisbenzothiazole, obtained by the chlorine oxidation of an alkaline solution of 2-mercaptobenzothiazole and containing about 5 parts of 2,2'-dithiobisbenzothiazole in suspension and about 1.5 parts of inorganic salts in solution, is stirred and heated. When the mixture begins to boil the organic liquid is allowed to steam distill until it is substantially removed. The agglomerated 2,2'-dithiobisbenzothiazole slurry is then charged to a centrifuge which has a 5-inch diameter basket and which is run at 3600 R. P. M. The following table compares the time required for the separation and recovery of the solids content of one liter of a slurry treated according to the above procedure. A comparison of the results obtained using chlorobenzene or xylene as the organic liquid with that obtained with an untreated sample is given as illustrative in the following table.

|  | Untreated Slurry | Chlorobenzene-Treated Slurry | Xylene-Treated Slurry |
| --- | --- | --- | --- |
| Charging time for filtration_____seconds__ | 52 | 32 | 30 |
| Centrifuging time for filtration_____seconds__ | 38 | 20 | 30 |
| Charging time for washing_____seconds__ | 56 | 22 | 30 |
| Centrifuging time for washing_____seconds__ | 40 | 40 | 40 |
| Total time for centrifuging operation_____seconds__ | 186 | 114 | 130 |
| Time_____per cent__ | 100 | 56 | 70 |

The charging time for filtration is the minimum time necessary to charge one liter of slurry into the centrifuge without splashing some over the top of the centrifuge basket. The centrifuging time for filtration is the time necessary to continue the centrifuging operation until the stream of water is first broken into drops at the tip of the centrifuge liquid outlet. The charging time for washing is the minimum time necessary to charge one liter of water into the centrifuge basket containing the 2,2'-dithiobisbenzothiazole cake without splashing over the top. The centrifuging time for washing is the time necessary for the wash water to run through the centrifuge until the stream is first broken into drops at the tip of the liquid outlet.

The time advantage can be made still much greater by altering the operating procedure to take advantage of the quick settling time of the treated slurry. The settling time of the slurry treated with the organic liquid is of an entirely different order of magnitude from that of the untreated slurry. Whereas the untreated slurry requires four hours for the solid material to settle to one-half volume, the chlorobenzene-treated slurry will settle in 140 seconds and the xylene-treated slurry in 300 seconds.

In the modified procedure the slurry treated with the organic liquid is allowed to settle and the aqueous layer decanted. The concentrated slurry is then washed with fresh water, settled, and again decanted. Repetition of these operations gives a slurry containing so little of the original inorganic matter in solution that washing of the cake in the centrifuge is unnecessary. The total centrifuging time is thus limited to the time required for charging the much reduced volume of slurry to the centrifuge and the time for centrifuging this concentrated slurry. In large scale operations this is not more than 25% of the centrifuging time required for recovering an untreated batch. Therefore, a much greater volume of plant slurry can be handled with the same number of centrifuges. Furthermore, centrifuging the cake agglomerated with the organic liquid results in a press cake of lower water content than that from the untreated slurry.

Example 2

A 3-liter vessel equipped with a stirrer, an overflow and inlets for 2,2'-dithiobisbenzothiazole slurry and the organic liquid is used as an agglomerator. It is maintained at a temperature of 60°–65° C. An aqueous slurry containing about 5 parts of 2,2'-dithiobisbenzothiazole is pumped into the agglomerator at a constant rate of approximately 125 to 150 ml. per hour. Monochlorobenzene is also fed continuously into the agglomerator at the rate of 20 ml. per liter of slurry. The 2,2'-dithiobisbenzothiazole is agglomerated with stirring at this temperature and overflowed into a column steam stripper. The monochlorobenzene is volatilized with steam fed from the bottom of the column countercurrently to the flow of the slurry. The monochlorobenzene is recovered through a condenser near the top of the column and the agglomerated 2,2'-dithiobisbenzothiazole slurry is dropped into a receiver at the bottom. The monochlorobenzene layer is separated from the condensate and returned to the process.

The agglomerated 2,2'-dithiobisbenzothiazole slurry obtained by this continuous process is comparable to that from the batch process in its physical properties.

Example 3

2.0 parts of toluene is added to 100 parts of an aqueous slurry of 2,2'-dithiobisbenzothiazole, obtained by the chlorine oxidation of an alkaline solution of 2-mercaptobenzothiazole and containing about 5 parts of 2,2'-dithiobisbenzothiazole in suspension and about 1.5 parts of inorganic salts in solution. The mixture is heated in an autoclave equipped with a continuous stirrer under 80 lb. p. s. i. pressure at 150° C. for 30 minutes. The toluene is then vented. The 2,2'-dithiobisbenzothiazole remaining in the autoclave is found to be no longer in the form of a slurry, but in the form of round agglomerates about ¼" in diameter. Practically all of the water can be decanted. No filtration or centrifuging is required.

I claim:

1. In a process for the separation of suspended particles of 2,2'-dithiobisbenzothiazole from an aqueous slurry containing particles too small to permit complete settling in any practical time which comprises adding to said slurry a small amount of a chemically inert, water-immiscible, organic solvent for the 2,2'-dithiobisbenzothiazole, the amount of organic solvent used being insufficient to completely dissolve the 2,2'-dithiobisbenzothiazole in the slurry and stirring the mixture for sufficient time to agglomerate the particles into free settling masses.

2. In a process for the separation of suspended particles of 2,2'-dithiobisbenzothiazole from an aqueous slurry containing particles too small to permit complete settling in any practical time which comprises adding to said slurry a small amount of a chemically inert, water-immiscible, organic solvent for the 2,2'-dithiobisbenzothiazole, heating the mixture and stirring the heated mixture for sufficient time to agglomerate the particles into free settling masses, the amount of organic solvent used being insufficient to completely dissolve the 2,2'-dithiobisbenzothiazole in the slurry under the conditions of the treatment.

3. In a process for the separation of suspended particles of 2,2'-dithiobisbenzothiazole from an aqueous slurry containing particles too small to permit complete settling in any practical time which comprises adding to said slurry a small amount of an inert, water-immiscible, organic solvent for the 2,2'-dithiobisbenzothiazole, stirring the mixture for a sufficient time to agglomerate the particles into free settling masses the amount used being insufficient to completely dissolve the 2,2'-dithiobisbenzothiazole in the slurry under the conditions of the treatment, and simultaneously heating the slurry sufficiently to remove the organic solvent by distillation.

4. In a continuous process of separating suspended particles of 2,2'-dithiobisbenzothiazole from an aqueous slurry containing particles too small to permit complete settling in any practical time which comprises adding the slurry and a water-immiscible organic solvent for the 2,2'-dithiobisbenzothiazole at substantially uniform rates to a substantially fixed amount of a mixture thereof, which mixture is subjected to continuous agitation and maintained at a temperature at which the organic solvent is distilled off at substantially the same rate it is being fed, and treated slurry is withdrawn from the mixture at substantially the same rate at which untreated slurry is fed thereto.

5. A process according to claim 2 in which the solvent is monochlorobenzene.

6. A process according to claim 2 in which the solvent is toluene.

7. A process according to claim 2 in which the solvent is xylene.

8. A process according to claim 3 in which the solvent is monochlorobenzene.

9. A process according to claim 3 in which the solvent is toluene.

10. A process according to claim 3 in which the solvent is xylene.

TSAI H. CHAO.

REFERENCES CITED

The following references are of record in the file of this patent:

UNITED STATES PATENTS

| Number | Name | Date |
|---|---|---|
| 1,889,429 | Wiegand | Nov. 29, 1932 |
| 1,949,434 | Schneider | Mar. 6, 1934 |
| 2,113,092 | Moran | Apr. 5, 1938 |